C. W. CRAWFORD.
VEHICLE SPRING.
APPLICATION FILED JAN. 15, 1914.

1,124,708.

Patented Jan. 12, 1915.

2 SHEETS—SHEET 1.

WITNESSES.

INVENTOR
CARY W. CRAWFORD.
by Attorney.

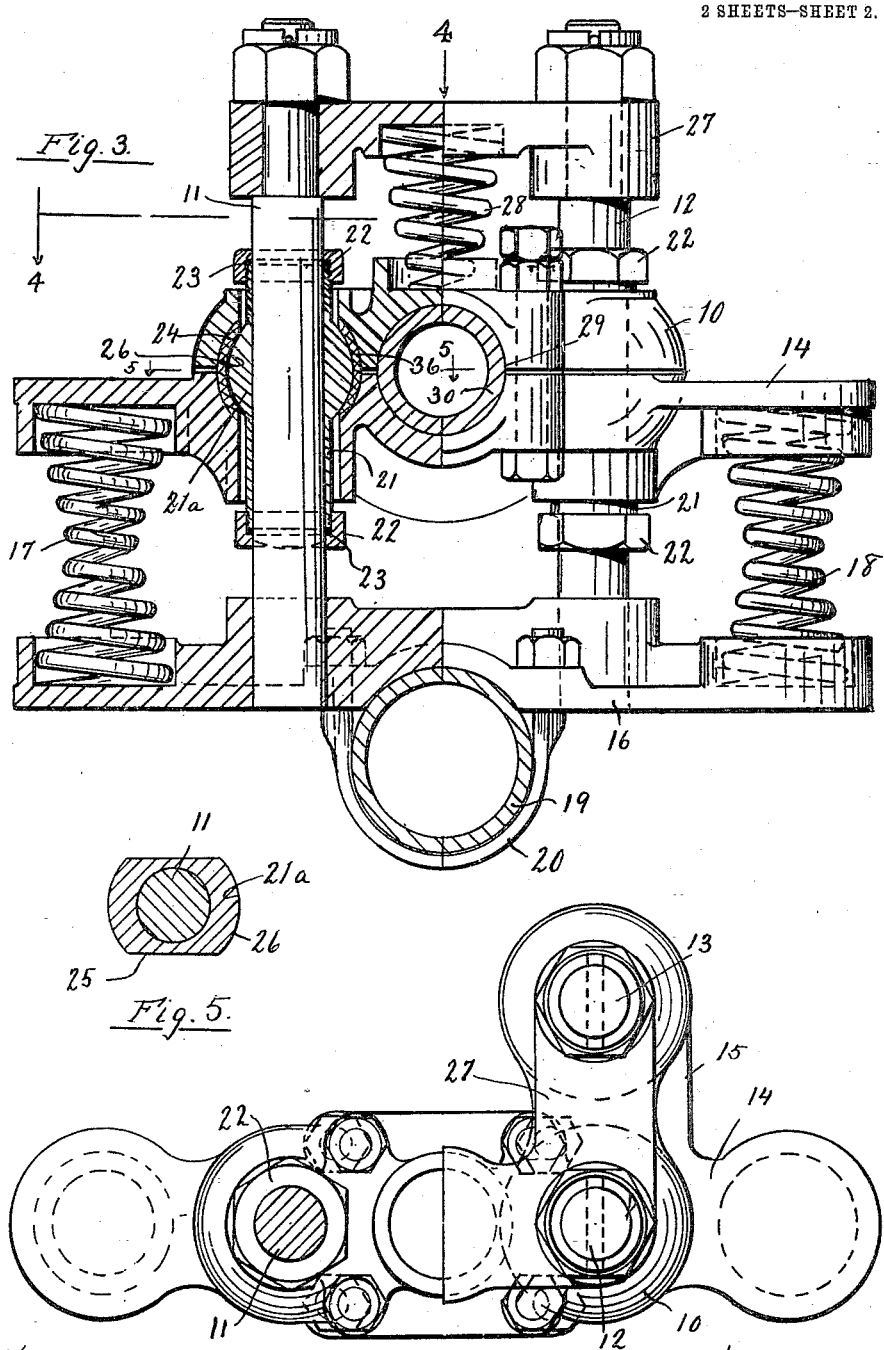

UNITED STATES PATENT OFFICE.

CARY W. CRAWFORD, OF LOS ANGELES, CALIFORNIA, ASSIGNOR TO EUREKA SHOCK ABSORBER COMPANY, OF LOS ANGELES, CALIFORNIA.

VEHICLE-SPRING.

1,124,708.  Specification of Letters Patent.  Patented Jan. 12, 1915.

Application filed January 15, 1914. Serial No. 812,196.

*To all whom it may concern:*

Be it known that I, CARY W. CRAWFORD, a citizen of the United States, residing at the city of Los Angeles, county of Los Angeles, State of California, have invented new and useful Improvements in Vehicle-Springs, of which the following is a specification.

My present invention is an improvement on the devices set forth in an application filed by me May 22nd, 1913, No. 769,195. In the further practical use of an automobile equipped with the devices described in said application I found that there was a little too much side roll to the body of the vehicle and it is the object of this invention to so improve on said former invention that such side roll is reduced to the minimum.

Figure 1:
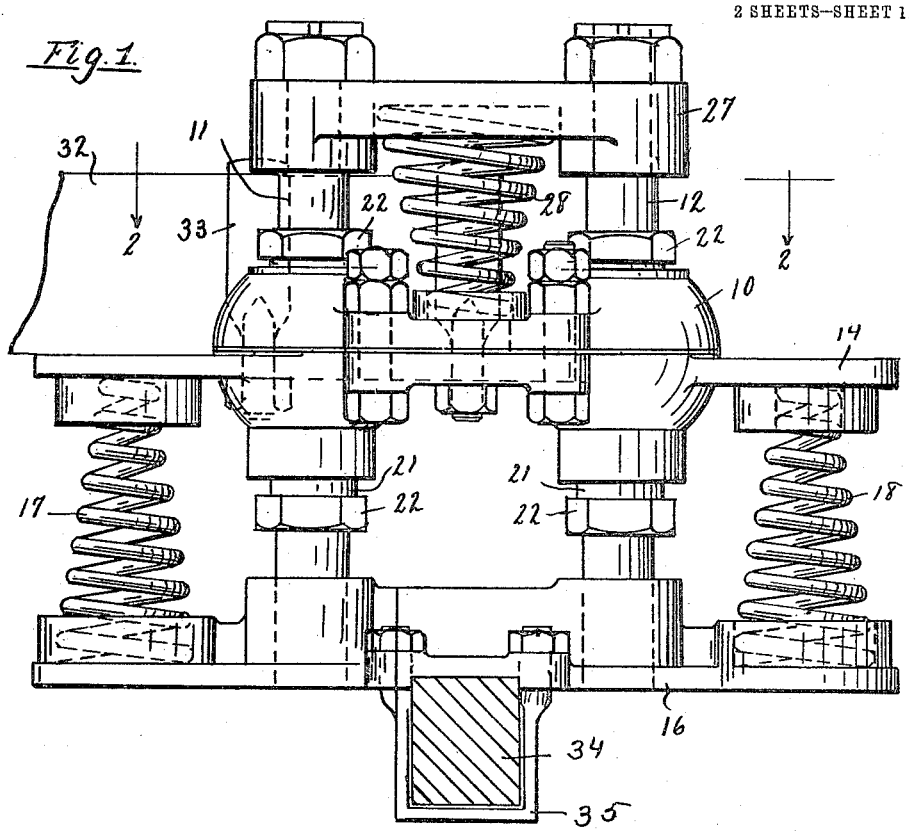
Figure 2:
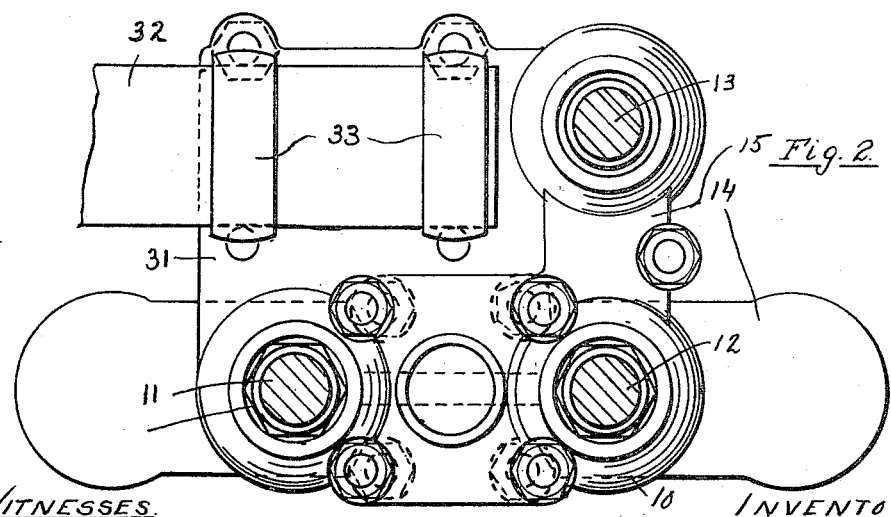

In the drawings forming a part of this application: Figure 1 is a side elevation of the springs at one of the front corners of an automobile; Fig. 2 is a plan of the parts shown in Fig. 1 with a part in section taken on the line 2—2 of Fig. 1 with the rebound spring removed; Fig. 3 is a side elevation of the springs at one of the rear corners of an automobile; Fig. 4 is a plan of the parts shown in Fig. 3 with a part in section taken on the line 4—4 of Fig. 3 with the rebound spring removed; Fig. 5 is a cross section of a guide rod and its guide contact on the line 5—5 of Fig. 3.

In the drawings I have illustrated one of the rear and one of the front springs. The others are of the same construction.

In the drawings the upper member of the rear resistance spring frame is composed of an L-shaped cap plate 10 provided with transverse vertical holes through which pass guide rods 11—12 and 13. The other member of the upper member of the resistance spring frame is composed of a longitudinal plate 14 provided with transverse holes through which pass guide rods 11 and 12 and an off set projection 15 through which passes guide rod 13. The lower member of the resistance spring frame is composed of a plate 16 of the same shape in plan as the lower plate of the upper member. Between these members are mounted coiled springs 17 and 18 which are preferably double helicovolute springs, but may be of other forms if desired. Guide rods 11—12 and 13 are rigidly secured in plate 16. Plate 16 is secured to the rear axle 19 of the machine by clips 20. Surrounding guide rods 11—12 and 13 where they pass through the upper member of the resistance spring frame are guide sleeves 21 which project both above and below said upper member and exterior thereof are provided with pierced caps 22 to hold felt washers 23 in contact with the guide rods to keep the dirt from entering between the rods and the sleeves. At the point of junction between cap and other member of the upper member of the resistance spring frame and around the guide rods are recesses 24 of a configuration to receive the guide sleeves, each of which at this point are provided with an enlargement 21ª. This enlargement has straight sides as shown at 25 in Fig. 5 and curved edges as shown at 26 in Fig. 5, and in Fig. 3. When positioned for use the straight sides would lie in a plane parallel with the longitudinal central vertical plane of the body of the vehicle. This shape of the guide sleeves permits of a free movement of the vehicle body within certain limits longitudinally and prevents its having transverse or a side roll movement.

Upon the top of guide rods 11 and 12 is secured the top member 27 of the rebound spring frame. Cap 10 of the resistance spring frame forms the bottom of the rebound spring frame. Between these last named members is mounted rebound spring 28 which is preferably a single volute helix spring. The top members of the rear resistance spring frames have transverse horizontal openings 29 extending therethrough in which is secured a bar 30 which passes beneath the body of the vehicle not shown and is secured thereto, thus connecting the rear of the body to the rear wheels. This connection is so made that the springs and a portion of the guide rods are at the side of the body and a portion of the guide rods are at the end thereof.

The springs at the front of the vehicle are constructed in all respects like those at the rear except that the lower plate of the top member 31 of the resistance spring frame is substantially in shape a parallelogram and is connected to the side bars 32 of the body frame by clips 33 and does not have a transverse horizontal hole therethrough.

The bottom plate of the front resistance spring frame is secured to the front axle 34 by clips 35. The springs and a portion of the guide lugs are at the side of the body and a portion of the guide lugs are at the front end of the body. A babbit lining 36 may be used in the recess around the enlarged portion of the guide sleeve. By this construction a long wheel base is provided for an automobile which renders it more secure than with a shorter wheel base. It will be understood that all springs are positioned after being compressed.

Having described my invention what I claim is—

1. In a vehicle, resistance and rebound spring frames at the sides of the corner of the body of the vehicle, the rebound frame being above the other frame; springs in said frames; guide rods secured in the lower members of the resistance spring frames and movable through the upper member thereof, said guide rods and frames being so located that a portion of the guide rods are at the sides and a portion at the ends of the vehicle, the top members of the rebound spring frames being secured upon the tops of the guide rods at the sides of the body.

2. In a vehicle, resistance and rebound spring frames at the sides of the corners of the body of the vehicle, said frames forming connecting means between the body and running gear, the rebound frames being above the other frames, said frames having vertical openings therethrough, said openings being enlarged centrally; springs in said frames, guide sleeves having enlarged central portions passing through the openings in said frames, the enlarged portions being globular on the edges and straight on the sides and fitting in the enlarged portions of the openings; guide rods secured in the lower members of the resistance frames and passing through the guide sleeves, said guide rods and frames being so located that a portion of the guide rods are at the sides and a portion at the ends of the body of the vehicle and the top member of the rebound frame being secured upon the tops of the guide rods at the sides of the body.

In witness that I claim the foregoing I have hereunto subscribed my name this 26th day of December, 1913.

CARY W. CRAWFORD.

Witnesses:
SYDNEY LEWIS,
GEO. R. COTTRELL.